Aug. 11, 1942.　　　A. P. PETERS　　　2,292,969
ALIGNING DEVICE
Filed Dec. 20, 1939　　4 Sheets-Sheet 1

INVENTOR
ALBERT P. PETERS
BY George B. White
ATTORNEY

Aug. 11, 1942.    A. P. PETERS    2,292,969
ALIGNING DEVICE
Filed Dec. 20, 1939    4 Sheets-Sheet 2

INVENTOR
ALBERT P. PETERS
BY
George B. White
ATTORNEY

Aug. 11, 1942.  A. P. PETERS  2,292,969
ALIGNING DEVICE
Filed Dec. 20, 1939  4 Sheets-Sheet 4

INVENTOR
ALBERT P. PETERS
BY George B. White
ATTORNEY

Patented Aug. 11, 1942

2,292,969

UNITED STATES PATENT OFFICE 2,292,969

ALIGNING DEVICE

Albert P. Peters, San Francisco, Calif.

Application December 20, 1939, Serial No. 310,207

2 Claims. (Cl. 33—46)

This invention relates to an aligning method and device.

In certain respects this invention is related to and is an improvement on my copending application Serial No. 278,507, filed June 10, 1939, now Patent 2,249,226, July 15, 1941.

An object of this invention is to provide a method and apparatus for producing indications corresponding to adjustment characteristics of parts of mechanisms relatively to each other or to a frame, and displaying the indications at points distant from the adjusted parts in such a manner that the shifting or changing of said indications are accomplished in accordance with the relative changes of position of the adjusted parts so as to indicate the relative attitude of said parts.

Another object of this invention is to provide a novel method and device for aligning parts relatively to each other by light projectors held by adjustable magnetic supports in a predetermined relation to said parts.

Another object of this invention is to provide a projector for aligning mechanisms which simultaneously projects rays in several predetermined directions for indicating various adjustment characteristics of an alignment of parts.

In this specification, and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

With the foregoing and other objects in view, which will be made manifest in the following detailed description, reference is had to the accompanying drawings for the illustrative embodiment of the invention, wherein.

Figure 1:
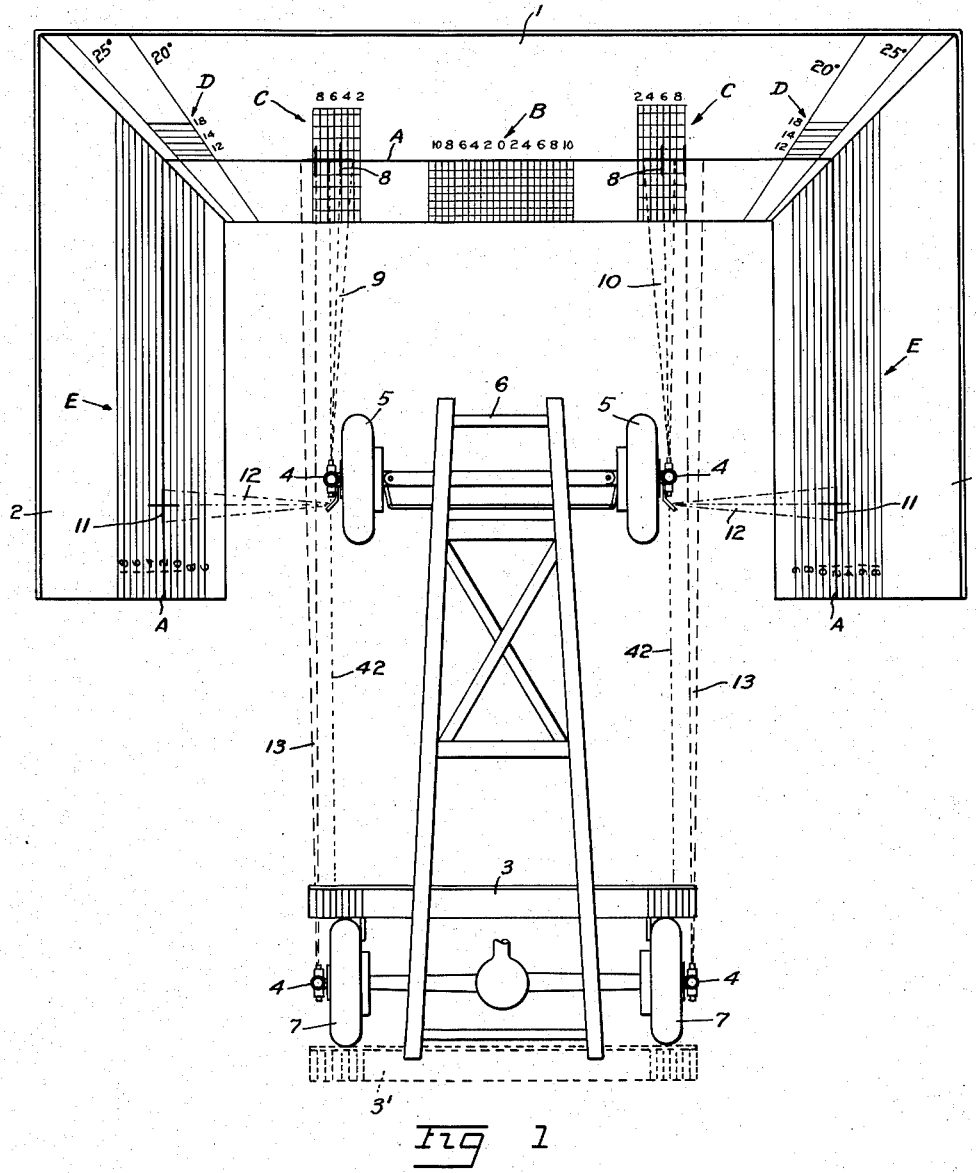
Fig. 1 is a top, perspective view of the device in operative position relatively to a vehicle.

In general the invention involves shifting of a visible mark by and with the adjusted parts so that the change of position of the visible mark is in accordance with the change of a given relative attitude of said parts, and the displaying of said visible mark on predetermined charts for reading the relative degree of shifting of said visible marks and of said parts. Particularly in adjusting the front wheels of automobiles charts having predetermined groups of graduations of markings for various angular changes of wheel attitudes are scanned by marks created by light rays projected at corresponding predetermined angles from the front wheels so that the wheel adjustments can be directly read from the positions of said light rays on the respective groups of markings on the charts.

In carrying out my invention the first step is to locate the charts with respect to the automobile. This step is accomplished by providing a chart symmetrically clamped over the rear wheels of the automobile. This chart has horizontal graduation marks near each end. Then another chart is provided spaced opposite the front wheels of the automobile. This second chart has thereon graduations symmetrical with the rear board graduation. Then aligned light beams are projected simultaneously forwardly and rearwardly of the front wheels in substantial parallelism with the planes of the front wheels. Then the second chart is moved sidewise until the forwardly directed light beams from the front wheels reflect upon symmetrical markings with respect to the center of the second chart. Thus the charts are centered relatively to the automobile. These graduation marks of the charts show the distance between the opposite wheels.

The so called toe-in adjustments of the front wheels of the automobile is also readily determined by the difference between the readings indicated by the forward and rearward light beams on the respective charts. The markings on the rear and the forward charts coincide horizontally and are graduated according to degrees horizontally so that the difference between the forward and rearward markings by the respective light beams corresponds to the number of degrees of the toe-in of the front wheels.

As the front wheels of an automobile are turned they assume different angular attitudes due to certain adjustments of their mountings. For instance such angular adjustments are the so called king pin slant and the caster adjustments described in detail in my said copending application. In the present method these adjustments are determined by separately observable indications. These angular adjustments manifest themselves in the altering of the angular positions of the front wheels during turning which are by the method herein described converted into rise and fall of light beam indications relatively to vertically graduated markings on the chart. These vertical graduations are so extended as to be observable throughout the full steering angle of the front wheels. This is accomplished in this illustrative embodiment by forming the vertical graduations by means of a plurality of parallel, spaced, horizontal lines extended the full length of the chart. One set of these horizontal lines is extended to a length corresponding to about the usual twenty or twenty-five degrees of the steering limit of the front wheels in each direction, and another set is extended beyond and outside said angles. The next step of the method is to project separate indications in the form of separate beams of light at different angles from each front wheel. One beam of light is projected so as to extend forward of the wheel, substantially along the horizontal center line of the plane of the wheel so that when the wheel is turned this light indication travels between the middle of the forward chart and the 20° or 25° steering angle markings. Another separate light beam is projected from each wheel at an angle to the plane of the wheel and unto the adjacent outer chart or marking so as to shift away from the outer steering angle marking when the first beam shifts toward the outer steering angle marking, and vice versa. Both beams are shifted by and with the changing of angular attitudes of the wheel. The forwardly directed light beam rises and falls with the rise and fall of the front wheel caused by the king pin slant and direct readings of the angle and extent of such rise and fall can be taken on the markings of the chart between the middle and the maximum steering angle indications.

The other beam rises and falls according to the tilt or angular change of the position of the plane of the wheel relatively to the ground due to the so called caster adjustment. This can be directly read relatively to the graduation marks on the chart located outside of the maximum steering angle indications. When the outer chart is parallel with the face of the wheel in straight position then the light beam for caster indication is projected at right angles to the plane of the wheel. It was found in practice that when the king pin slant chart is at right angles to and the caster charts are respectively parallel with the planes of the front wheels in straight position, then separate readings can be taken with greater accuracy and clearness of indication. The king pin slant and caster charts are arranged at definite predetermined angles to each other and the separate light beams projected unto the respective charts are at corresponding predetermined angles to each other.

The charts are adjusted at a predetermined distance from the wheels by so locating the charts that the forwardly directed light beams coincide with a norm line or indication on the chart as a starting point of indication. The light beams are then shifted by and in accordance with the respective changes of angular attitudes of the front wheels and the respective markings on the charts scanned by the beams give the reading of the angular attitude at each degree of turn of each front wheel. The adjustments of the wheels or other parts then can be corrected to any desired degree of adjustment while the change of adjustment can be continually observed while working.

The illustrative apparatus for carrying out my invention includes a front chart 1, side charts 2, rear chart 3, and projectors 4. The projectors 4 are detachably held on the respective parts to be tested or adjusted, for instance on the front wheels 5 of an automobile 6. The front chart 1 is spaced in front of the front wheels 5. The side charts 2 are spaced from the sides of the front wheels 5. The rear chart 3 is engaged with the rear wheels 7 of the automobile 6.

The graduations on the front chart 1 are grouped for various readings to be taken by the shifting of the projectors 4 with the turning of the front wheels 5. There is a norm line from which the vertical graduations are measured, which in this illustration is the horizontal line A which extends the full length of the charts 1 and 2 from end to end. In this illustration the norm line bears the marking "12." All the graduations are substantially symmetrically spaced above and below the line A and about the vertical "0" line across the middle of the first chart 1.

The middle group of markings B of the front chart 1 includes vertical lines numbered consecutively to "10" from each side of the middle line "0." These vertical lines of the middle group of markings B are used to denote the inner limits of the steering angle of each front wheel.

The group of middle markings B also includes parallel horizontal lines equally spaced below the norm "12" line A, which are used for reading the lowest points of the fall of the wheel caused by the king pin slant.

A pair of groups of markings C are symmetrically spaced on the opposite sides of the middle group B so as to be located substantially in positions aligned with the straight forward positions of the front wheels 5. The vertical lines of these markings C are marked on the chart from "2" to "8" or "22" to "28" corresponding to twenty-two to twenty-eight inches of width or trackage of the usual cars. The projectors 4 preferably project a well defined mark, such as cross hair mark 8 the vertical hair line of which is substantially parallel with the plane of the wheel. When the forward projected beams 9 and 10 coincide with symmetrical vertical lines of the markings C, then the charts are centered with respect to the automobile. The angle of the vertical hair line of the cross hair mark 8 relatively to the vertical lines of the markings C indicates the so called camber of the wheels.

It is to be noted that the vertical lines of the markings C of the front chart 1, and the vertical trackage width markings C' of the rear chart 3 are identical and symmetrical. Thus the difference between the rearward reading on the chart 3 and the forward reading on the group C gives the reading of the degree of "toe-in."

The next groups of markings on the front chart 1 are the groups D, one group near each end of the front chart 1 so located that the respective front wheels 5 at their maximum outward turn point toward the respective markings D. Each group of markings D includes vertical lines indicating "20° or 25°" turn which are the usual steering angles for automobiles front wheels. The graduation of this group D formed by spaced horizontal lines above the norm lines A cooperate with the mark 8 projected from the projectors 4 to measure the maximum rise of the front wheel 5 and of the light ray mark 8 at or near the extreme steering angle. This rise or fall indicated by the forward projected mark 8 is caused by the king pin slant adjustment of the wheels and therefore the king pin slant adjustment of the front wheels 5 can be accurately determined, equalized and adjusted by observing the position of the projected marks 8 on the groups of markings B and D. This king pin slant adjustment reading is illustrated on Fig. 2. The positions of the light beams 9' and 10' show on the middle group B the inner limit of the respective steering angles of the front wheels 5 and the fall of the wheels 5. The positions of the light beams 9" and 10" indicate on the outer groups D the outermost limits of the steering angle and the highest rise of the wheels 5 caused by the king pin slant adjustment.

The vertical graduations formed by spaced horizontal line markings E on the side charts 2 are spaced above and below the continuation of the norm line A so as to give readings by the fall and rise of the cross hair mark 11 projected at right angles from the plane or face of each front wheel 5. When the front wheel 5 is in straight position, as in Fig. 1, the light beam 12 is projected on the norm line A. As the front wheel 5 is turned inwardly toward the center of the automobile the plane of the wheel tilts inwardly by reason of the caster adjustment and the light beam 12 is moved toward the outermost steering markings D of the front chart 1 and is directed upwardly to a maximum rise shown by the eight beam position 12'. When the front wheel 5 is turned outwardly away from the center of the automobile the plane of the front wheel 5 is tilted outwardly by its caster adjustment, and the side light beam is moved in a direction away from the front chart 1 and downwardly below the norm line A to its lowermost position indicated by the light beam position 12". Thus by direct reading of the markings E on the side charts 2 indicated by the projected marks 11, the relative caster adjustments can be accurately determined, and observed during adjusting operations without any calculation or measurements.

The relative alignment of the front wheels 5 and rear wheels 7 may be also determined by a second set of projectors 4 directed from the rear wheels 7 forwardly at the front chart 1 so that light beams 13 can be read alongside the forward light beams 9 and 10 of the front wheels.

It is also to be noted that the rear chart or board 3 may be secured also at the rear of the rear wheels 7 as shown in broken lines at 3' on Fig. 1.

The rear chart 3 is made of a comparatively narrow strip which may be readily located on the floor near the rear wheels 7 of the vehicle or automobile. The rear chart 3 is automatically centered on the rear wheels 7 by opposed arms 14 extended at right angles from the plane of the chart 3. Links 15 extend from the arms 14 alongside the chart 3 and are pivoted to the opposite ends of a lever 16 fulcrumed on a pivot 17 in the center of the rear chart 3. Thus by engaging the arms 14 with the inner sides of the rear wheels 7 the rear chart 3 is automatically centered to indicate the trackage on the symmetrical markings C'.

Each of the projectors 4 of the herein illustrative embodiments includes a tube 18 with aligned light directing units 19 at right angles to the tube 18, and magnetic clamping means 20 for fastening the projectors 4 in position on the parts to be adjusted. When used on wheels the magnetic clamping means 20 align the projectors 4 so that the axis of the light directing units 19 overlies a diameter of the wheel.

The tube 18 is open at the top and bottom. A lining tube 21 is fastened in spaced relation to and inside of the tube 18. A finlike cooling structure is formed between the inner tube 21 and outer tube 18 by a corrugated conductor shield 22 longitudinally placed in the annular space between the tubes 18 and 21. The outer tube 18 has side apertures 23 which further dissipate heat usually developed by the illuminating elements of a projector. The illumination in this embodiment is provided by an electric light 24 held in a suitable socket 25 within the inner tube 21. Ventilation is further accelerated by a small fan 26 mounted near the end of the inner tube 21 below the light socket 25.

The light beam directing units 19 are adjustably located in aligned tubular sockets 27 extended from opposite sides of the outer tube 18 substantially at right angles to the tube 18. The tube 18, the lining tube 21 and the shield 22 are provided with openings 28 in registry with the tubular side sockets 27. The light rays are thus directed from the light 24 out through the side openings 28 then through both tubular sockets 27, and out through both light beam directing units 19.

Each light beam directing unit 19 includes a tubular casing 29 adjustably fitted in the socket 27. A pair of spaced lenses 30 are mounted in the passage of the casing 29. A sharp mark is obtained by placing the pattern of the mark of the projected beam between the lenses 30. In the herein embodiment a so called cross hair 31 is fixed across the passage of the casing 29 so that the vertical hair line thereof is parallel with the axis of the tube 18. The light beams can be focused by sliding the light directing units 19 toward or away from the light in the usual manner.

Figure 8:
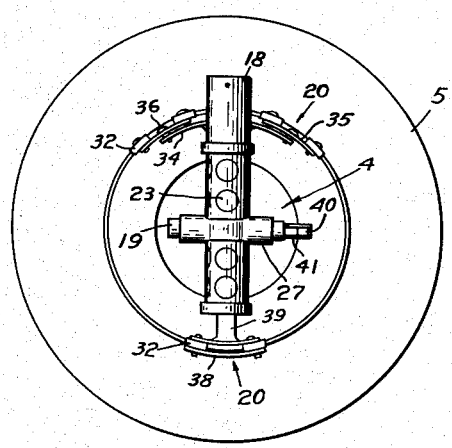
Fig. 8 is a side view of the projector mounted on a wheel.
Figure 9:
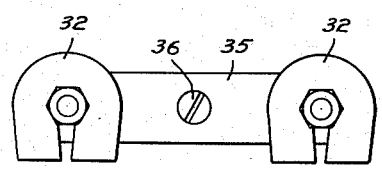
Fig. 9 is a top plan view of the electromagnets and their supporting elements.

The magnetic clamping means 20 of each projector 4 includes a plurality of magnets 32 preferably arranged in pairs. The upper clamping means 20 has a bracket 33 extended from the tube 18 so as to be located substantially at right angles to the light directing units 19. An arcuate base 34 on the bracket 33 supports at its ends magnet bases 35, which latter are yieldably but firmly held by a screw 36 bearing against a coil spring 37 between the bracket base 36 and the magnet base 35. On the top of each magnet base 35 are fixed a pair of spaced magnets 32 on opposite sides of the spring mounting. This mounting is firm but has sufficient yieldable adjustment to adapt it to slight variations of the curvature or unevenness of a surface. For instance as shown in Fig. 8 the upper magnetic clamping means 20 readily adapts itself to the usual curvature of the average rim of an automobile wheel 5. The lower clamping means 20 in this illustration has an arcuate magnet support frame 38 on the end of a bracket 39 extending from the lower end of the tube 18. The arcuate arrangements of the series of magnets 32 are substantially on the circumference of a circle a diameter of which coincides with the axis of the tube 18, and the axis of the projector units 19 coincides with another diameter of the circle at right angles to the axis of the tube 18.

The projection of a light beam at right angles to the plane of the projector 4 is accomplished by a reflector or refractor, such as a prism or mirror or the like to direct the light at a desired angle. In this illustration a mirror 40 is held in an angular skeleton frame 41 in the path of the light rays which issue from one of the light directing units 19. The mirror reflects the light beam at right angles to the axis of the units 19. The directing of the light beam is rendered selective by sliding the mirror 40 in the frame 41 so as to be adjustable into an out of way position thereby to allow the travel of the light beam straight, for instance rearwardly as indicated at 42 in Fig. 1.

Figure 2:
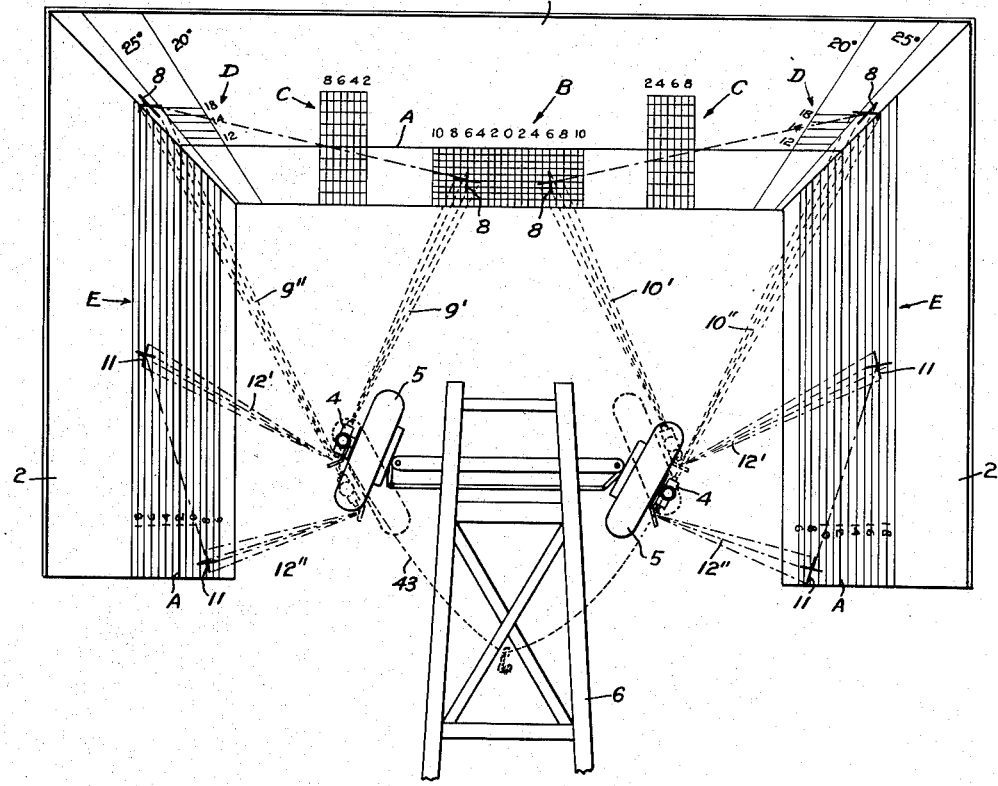
Fig. 2 is a top, perspective view of the device showing diagrammatically the relative paths of the indications for different adjustments.
Figure 3:
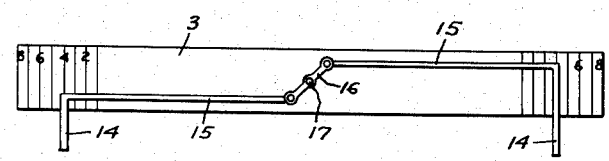
Fig. 3 is a face view of a rear chart board to be used in connection with the rear wheels of the vehicle.
Figure 4:
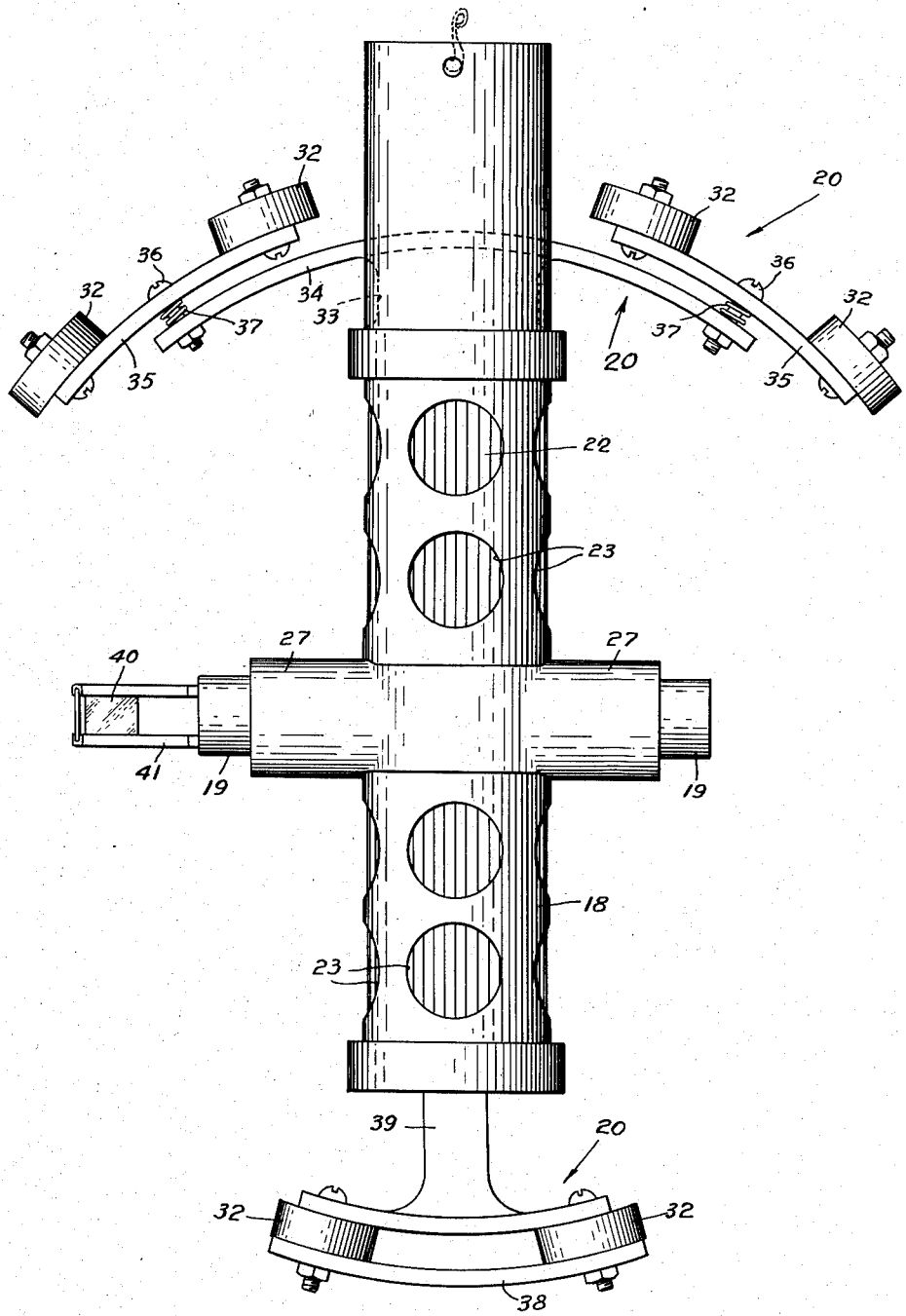
Fig. 4 is a side view of a projector constructed in accordance with my invention.
Figure 5:
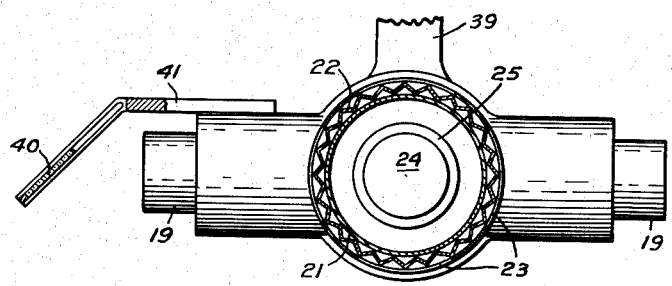
Fig. 5 is a top plane view, partly in section of the projector.
Figure 6:
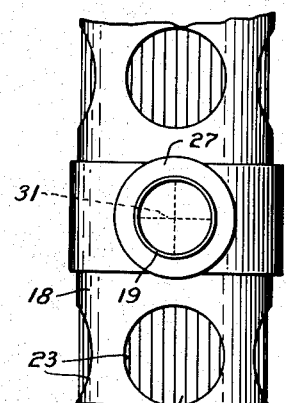
Fig. 6 is a fragmental view of the projector, looking into the projector lens.
Figure 7:
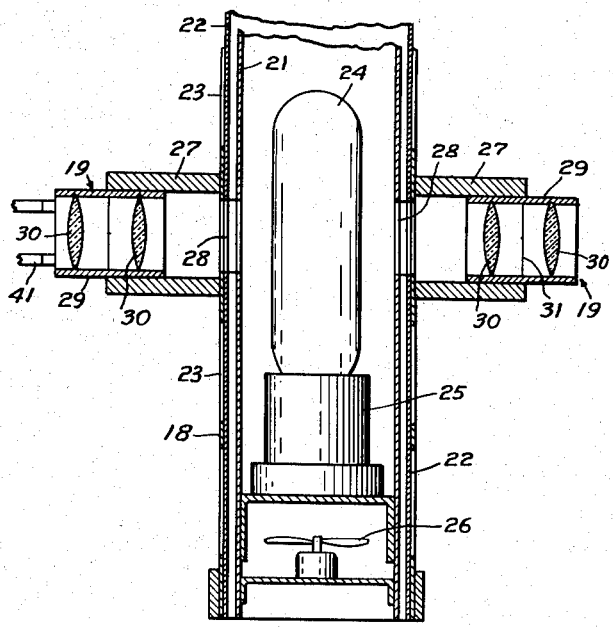
Fig. 7 is a fragmental sectional view of the projector.

The projectors 4 are preferably suspended on an overhead line 43 indicated in Fig. 2 so as to keep them in position ready for operation relatively to the charts, and also to prevent injury to the projectors 4 in case of accidental moving of a vehicle on which the projectors 4 may be mounted.

In operation the projectors 4 are quickly snapped on any part or frame to be tested or adjusted in a desired position. The chart is then aligned so that the light beam mark is projected on a norm or starting line. Then the relative adjustments can be directly read by the positions of the light beam marks on the groups of graduations on the charts.

In adjusting the front wheels 5 of an automobile the projectors 4 are so secured onto the front wheels 5 that the axis of the tube 18 is parallel with and overlies the plane of the wheels 5 and the axis of projection is parallel with and overlies the horizontal diameter of the plane of the wheel 5. The chart 1 is so adjusted that the projected marks 8 from the opposite wheels 5 are on the norm line A and are symmetrical around the vertical center line or "0" line of the front chart 1. Then in each attitude of the wheel 5 the respective markings 8 or 11 cooperate with the respective groups of graduations on the charts 1 or 2 to provide direct readings of the respective angular displacements or adjustment characteristics of the wheels 4.

Having thus described my invention what I claim and desire to secure by Letters Patent is:

1. Apparatus for depicting the angular inclination of the front wheel of a vehicle as mounted on a king pin, said apparatus including means for projecting light in cross-haired beam form, means for attaching said projecting means to said wheel in fixed relation to the plane thereof and a screen adapted to intercept said beamed light and having reference indicia thereon for measuring the angular inclination of said wheel as indicated by the movement of said beamed light over said intercepting screen and relative to said indicia and by the variation of the angular attitude of the cross hair of said light relative to said indicia during said movement when said wheel is swung about by moving said king pin.

2. Apparatus for aligning vehicle wheels including means for projecting from a vehicle wheel light in beam form having a fixed relation to the plane of the wheel and configured so as to reveal rotation of the beamed light, said apparatus further comprising a screen adapted to intercept said beamed light and provided with reference indicia for measuring the vertical and horizontal angular displacement of said wheel when swung about from one angular relation to the longitudinal axis of said vehicle to another relation, said displacement being indicated by the movement of said beamed light over said intercepting screen from one reference indicium to another and by the variation of the angular attitude of said beamed light as effected by rotation thereof during said movement.

ALBERT P. PETERS.